March 23, 1971 H. A. RUTTER Re. 27,090

INDIVIDUAL DRY DOCK FOR BOATS

Original Filed March 1, 1965 2 Sheets-Sheet 1

INVENTOR.
Henry A. Rutter
BY William S. Dorman
ATTORNEY

INDIVIDUAL DRY DOCK FOR BOATS

Original Filed March 1, 1965 2 Sheets-Sheet 2

INVENTOR.
Henry A. Rutter
BY William S. Dorman
ATTORNEY

United States Patent Office

Re. 27,090
Reissued Mar. 23, 1971

27,090
INDIVIDUAL DRY DOCK FOR BOATS

Henry A. Rutter, Rte. 1, Eucha, Okla. 74342

Original No. 3,362,172, dated Jan. 9, 1968, Ser. No. 435,816, Mar. 1, 1965. Application for reissue Nov. 6, 1969, Ser. No. 871,497
Int. Cl. B63c *1/06;* E02c *3/00*
U.S. Cl. 61—65 10 Claims

Matter enclosed in heavy brackets [ ] appears in the original patent but forms no part of this reissue specification; matter printed in italics indicates the additions made by reissue.

ABSTRACT OF THE DISCLOSURE

An individual dry dock particularly for relatively small water craft wherein a movable frame is pivotally and vertically reciprocally mounted in a boat well filled with water. In a lowered position of the frame the boat may be floated thereon and pontoons are provided for the frame which may be filled with air in order to elevate the frame and boat to a position out of the water. Conversely, air may be withdrawn from the pontoon for lowering the frame and boat into the water.

This invention relates to improvements in docks for boats and more particularly, but not by way of limitation, to an individual dry dock for relatively small water craft.

It is usually considered to be desirable to store a boat or other water craft out of the water when the craft is not in use in order to prevent the formation of undesirable marine growth on the bottom hull portions thereof. As a result, there are usually a considerable number of commercial dry docks provided around a lake or other water area where a great number of boats may be docked or stored out of the water. As a general rule, however, a boat being kept in an individual dock or at a place somewhat remote from the commercial dry docks, presents a problem in this respect since it is difficult to raise or elevate these individual boats to positions out of the water for storage.

The present invention contemplates an individual dry dock for boats and particularly for relatively small water craft. The dry dock comprises a boat well filled with water wherein a boat may be driven or otherwise maneuvered into the well in the usual manner for docking or mooring thereof. A movable frame is disposed or secured within the boat well and is provided with a plurality of pontoon members which may be selectively filled with air for raising or elevating the frame within the wall. As the frame is elevated, it engages the boat disposed within the well for raising the boat therewith to a position out of the water. The movable frame may be maintained in its elevated position for storage of the boat out of the water until such time it is desired to use the boat again. In order to lower the boat into the water within the well, the air may be released from the pontoons whereby the movable frame will be lowered into the water, carrying with it the boat supported thereby. The frame may be maintained in its lowermost position when the boat is not in the well or at such times when the boat is to be docked or moored within the water contained in the well.

It is an important object of this invention to provide an individual dry dock for water craft.

Another object of this invention is to provide an individual dry dock for relatively small water craft which may be readily elevated for storing the craft out of the water when not in use and which may be readily lowered for returning the craft to the water.

Still another object of this invention is to provide an individual dry dock for water craft which may be alternately elevated and lowered by the control of air directed to pontoon members carried thereby.

A further object of this invention is to provide a novel individual dry dock for water craft which is simple and efficient in operation and economical and durable in construction.

Other and further objects and advantageous features of the present invention will hereinafter more fully appear in connection with a detailed description of the drawings in which.

Figure 2:
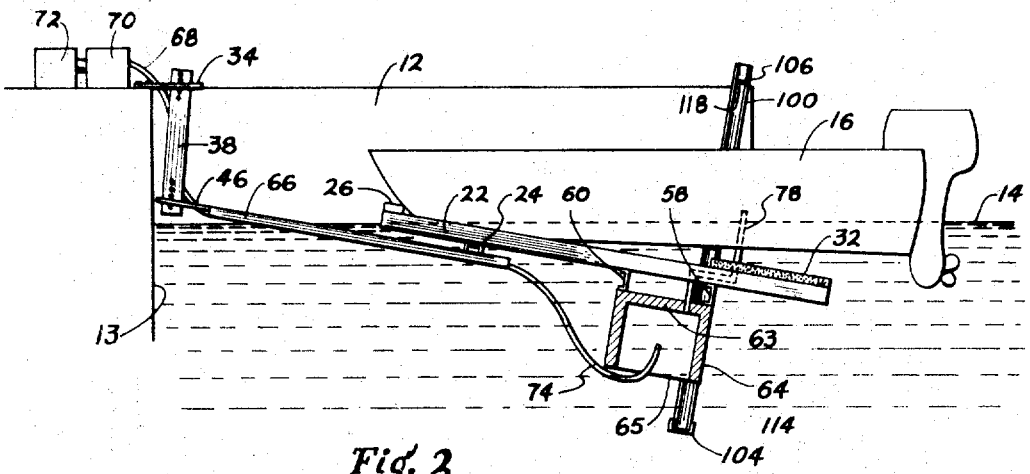
FIGURE 2 is a side elevational view of a dry dock embodying the invention in the lowered position thereof wherein a boat is docked within the water.
Figure 3:
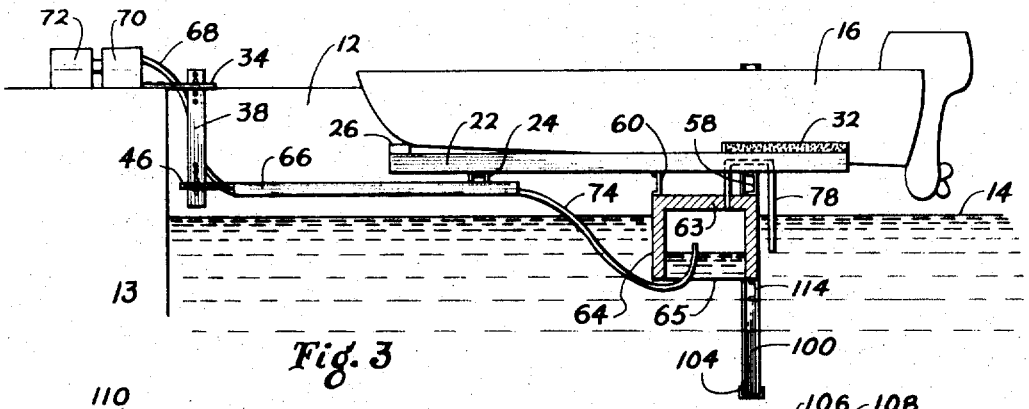
FIGURE 3 is a view similar to FIGURE 1 depicting the dry dock in an elevated position for storing a boat out of the water.

Referring to the drawings in detail, the dry dock generally indicated at 10 comprises the usual substantially rectangular recess or well 12 partially filled with water 14. One end 11 of the wall is open for receiving a boat 16 there in the usual manner during docking thereof and the opposite end 13 thereof is preferably closed. A movable frame 18 is secured within the well 12 in a manner as will be hereinafter set forth and is normally disposed partially beneath the surface of the water 14 as shown in FIGURE 2 when the boat 16 is maneuvered into position within the well 12. The frame 18 is adapted for elevation within the well 12 in a manner as will be hereinafter set forth for elevating the boat out of the water as shown in FIGURE 3 when the boat is not in use.

The frame 18, as depicted herein, comprises a pair of spaced longitudinally extending channel or support members 20 and 22 having any desired number of cross members 24 (only one of which is depicted herein) secured therebetween. A keel pad 26 which comprises a transversely extending support member 28 having suitable padding thereon is secured in the proximity of one end of the support members 20 and 22 for receiving the keel of the boat 16 thereagainst as the boat is maneuvered into position within the well 12. A pair of substantially identical transom pads 30 and 32 are provided on each support member 20 and 22, respectively, and secured thereto in any well known manner (not shown) in the proximity of the opposite or outer ends thereof for cooperation with the keel pad 26 to support the boat 16 in the elevated position of the frame 18.

A bracket member 34 is secured to the surface of the deck area 36 surrounding the well 12 and is preferably substantially centrally disposed at the closed end 13 of the well. The bracket 34 is provided with an elongated aperture 36 for slidably receiving a strap member 38 therethrough. The strap member 38 is provided with a plurality of spaced apertures 40 and may be pivotally secured within the aperture 36 by means of complementary spaced pin members 42 and 44 which may extend through a selected pair of the apertures 40 whereby the pins 42 and 44 are disposed on the opposite sides of the bracket 34 as particularly shown in FIGURE 1. It will be apparent that the downwardly position of the strap 38 with regard to the bracket 34 may be adjusted, as desired, by the selection of the appropriate apertures 40 for receiving the pins 42 and 44 therthrough. A second bracket member 46 is spaced below the bracket 34 and is provided with an elongated slot 48 for slidably receiving the strap 38 therethrough. The bracket 46 is pivotally secured in position on the strap 38 by means of pin members 50 and 52 which are disposed through appropriate pairs of the apertures 40 in the manner as hereinbefore set forth. The spacing between the brackets 36 and 46 may be adjusted by the selection of the desired apertures 40 for receiving the pins therethrough.

A boom 52, or the like, is rigidly secured to the bracket 46 in any well known manner such as by welding, or the like, and extends outwardly therefrom for connection with the cross member 24. The cross member 24 may be secured to the boom 52 in any well known manner and as depicted herein is secured thereto by means of a suitable pin member 54 and complementary apertures 56 are provided on the boom 52 and are longitudinally spaced therealong whereby the distance between the end wall 13 and the frame 18 may be adjusted as desired.

A cross beam 58 is secured to the channel members 20 and 22 in any well known manner and is spaced slightly inwardly from the outer extremity thereof. The opposite ends of the beam 58 extend beyond the channel members 20 and 22 for a purpose as will be hereinafter set forth. A second cross beam 60 similar to the beam 58 is secured to the channel members 20 and 22 in a similar manner and is spaced inwardly therefrom as viewed in the drawings. A pair of substantially identical pontoon members 62 and 64 are carried by the cross beams 58 and 60 and extend downwardly therefrom. The pontoons 62 and 64 may be constructed from any suitable material and as shown in FIGURES 2 and 3 are of a substantially box-type construction. However, the pontoons may be of any desired configuration with the upper end thereof being closed by a wall 63 and the bottom end 65 thereof being open. An air header pipe 66 is carried by the frame 18 in any suitable manner (not shown) and extends longitudinally substantially throughout the length thereof.

An air hose 68 extends from one end of the air header pipe 66 to a suitable air compressor 70 which is actuated or operated by a suitable motor 72. The motor 72 and compressor 70 may be mounted on the dock area 36 in the proximity of the well 12 or in any other convenient place as desired. A pair of air injection lines 74 and 76 extend from the opposite ends of the air header pipe 66 into communication with the open end 65 of each of the pontoons 62 and 64. The air injection lines 74 and 76 may be suitably secured to the respective pontoons 62 and 64 in any well known manner for retaining the open or outer ends of the lines in communication with the open end of each pontoon. Upon actuation or operation of the compressor 20, air will be forced through the injection lines 74 and 76 and into the interior of the pontoons 62 and 64. The air will bubble up through any water contained therein and form an air pocket between the surface of the water and the wall 63 to provide buoyancy for the pontoons in a manner and for a purpose as will be hereinafter set forth. A vent line or air discharge hose 78 extends through the upper wall 63 of the pontoon 64 to provide communication between the interior of the pontoon 64 and the exterior thereof, and a similar vent line 80 provides communication between the interior and exterior of the pontoon 62. The trapped air may be discharged from the pontoons 62 and 64 through the vent lines 78 and 80, respectively, to reduce the buoyancy of the pontoons as will be hereinafter set forth.

Figure 1:
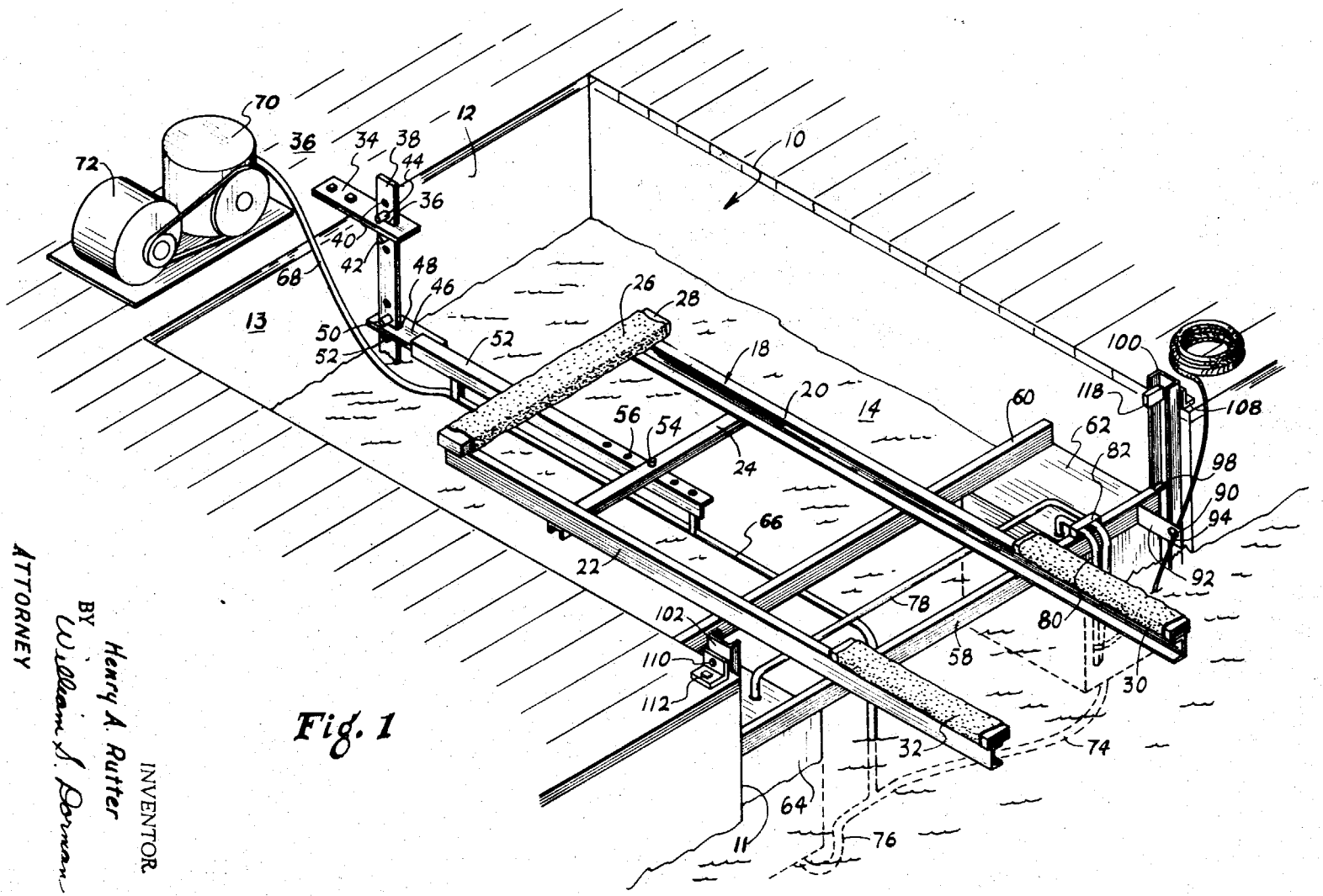
FIGURE 1 is a perspective view of an individual dry dock embodying the invention.
Figure 4:
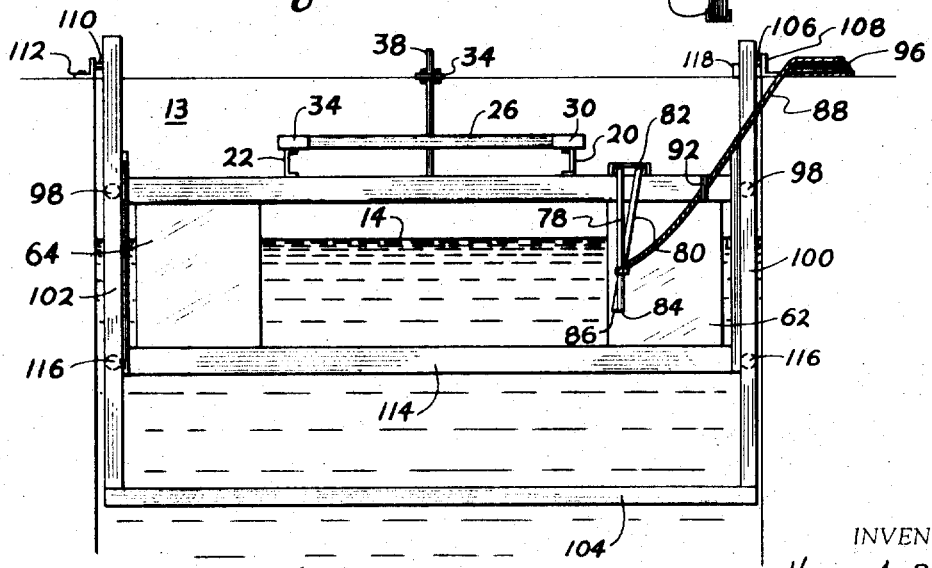
FIGURE 4 is an end elevational view of a dry dock embodying the invention and depicting the dock in an elevated position.

As particularly shown in FIGURE 1, it is preferable that the vent line 78 be arranged in a manner for extending to the pontoon 62 for disposition adjacent the vent line 80. The lines 78 and 80 may be retained in this position by a suitable bracket 82 which is secured to the cross beam 58. The outer ends 84 and 86 (FIGURE 4) of the lines 78 and 80, respectively, are open and are preferably disposed in close relationship to each other. A rope or flexible cable 88 is secured around the lines 78 and 80 for maneuvering thereof as will be hereinafter set forth. The rope or cable 88 extends through an aperture 90

(FIGURE 1) provided in an arm 92 which is secured to the beam 58 and extends outwardly therefrom. The aperture 90 is preferably of a substantially key hole configuration or provided with a reduced slot 94 extending radially therefrom for facilitating retaining of the rope 88 in position within the aperture 90 as will be hereinafter set forth. The free end of the cable 88 may be coiled as shown at 96 in FIGURE 3 and disposed on the deck area surrounding the well 12.

When the rope 88 is slack, the lines 78 and 80 dangle or hang downwardly from the cross beam 58 due to the weight thereof whereby the open ends 84 and 86 thereof will be disposed beneath the surface of the water 14. It will be apparent that any air present within the pontoons 62 and 64 will be trapped therein and cannot escape therefrom when the ends 84 and 86 of the lines 78 and 80 are disposed within the water. In order to vent or discharge the air from the pontoons 62 and 64, the ends 84 and 86 may be lifted from the water by manual handling of the rope 88. In order to maintain the ends 84 and 86 in this raised position, the rope 88 may be wedged into the reduced slot 94 in any well known manner (not shown). For example, a knot (not shown) or plurality of spaced knots may be provided in the rope. The knot or knots may be of sufficient size whereby it will not pass through the reduced slot portion 94, but will pass through the aperture 90. Thus, with the rope wedged or disposed within the reduced slot 94, the knot will preclude slippage of the rope from the locked position.

A roller 98 is journalled in any suitable manner (not shown) at each end of the beam 58 for engagement or disposition within a pair of oppositely disposed guide channels 100 and 102. The guide channels 100 and 102 are spaced apart at the lower ends thereof by a brace member 104. The guide channel 100 is pivotally secured at the opposite or upper end in any well known manner such as by a pin 106 and complementary brace or bracket 108 suitably secured to the deck area adjacent the well 12. The guide channel 102 is similarly pivotally secured by a pin 110 and complementary brace or bracket 112 secured to the deck area oppositely disposed from the bracket 108. Of course, it will be apparent that a lower cross beam 114 similar to the beam 58 may be disposed beneath the pontoons 62 and 64 and secured thereto in any well known manner (not shown) if desired. A roller 116 may be suitably journalled at each end of the beam 114 and disposed within the guide channel 100 and 102 in a similar manner as the rollers 98. The rollers 98 and 116 freely ride within the guide channels 100 and 102 during any vertical fluctuation of the frame 18 for a purpose and as will be hereinafter set forth.

A suitable microswitch 118 is secured to one of the guide channels such as the guide channel 100 and is disposed in the proximity of the upper end thereof for engagement by the beam 58 during raising of the frame 18. The microswitch 118 is connected in series with the circuit to the motor 72 in any well known manner (not shown) whereby engagement of the beam 58 with the microswitch 118 will stop or shut off the motor 72.

Operation

The dry dock 10 may be utilized in substantially any water area wherein it is desired to provide an individual dry dock for water craft or the frame 18 and associated parts may be installed in substantially any already existing boat well or dock. The frame 18 is pivotally secured to the well 13 by the boom 52 in combination with the brackets 34 and 36 and strap member 38 extending therebetween whereby the rear end or outer end of the frame may fluctuate vertically without releasing the connection of the frame with the boat well or dock recess 12. The pontoons 62 and 64, being open at the bottom ends 65 thereof, are normally filled with water as shown in FIGURE 2 and the combined weight of the frame 18 and pontoons maintain the frame in a normally lowered position whereby the frame 18 extends outwardly and downwardly from the pivotal connection with the wall 13. In this position, the pontoons 62 and 64, cross beams 58 and 60 and outer ends of the support channels 20 and 22 are disposed beneath the surface of the water 14.

With the frame 18 in this lowered position, free access is provided through the open end 11 both to and from the recess or boat well 12 by the boat 16. The boat 16 may be maneuvered into position within the recess 12 in the usual manner for mooring and may be removed therefrom for use in the well known manner. The keel of the boat will normally rest against the keel pad 26 for protection of the boat during mooring as is well known. The angularly disposed frame 18 will be disposed in the water beneath the boat as particularly shown in FIGURE 2. However, when it is desired to store the boat 16 in the recess 12 for longer periods of time, the boat may be lifted from the water to the position shown in FIGURE 3.

To accomplish this, the air compressor 70 may be activated by the motor 72 in the usual manner for supplying air under pressure to the air header pipe 66. The air from the pipe 66 is directed through the open ends 65 af each pontoon 62 and 64 through the air injection lines 74 and 76. The air forced through the open ends of the injection lines will bubble upwardly through the water contained within the pontoons and will be trapped between the upper wall 63 and the surface of the water, thus providing an air pocket within the pontoons for creating buoyancy therefor. As the air is admitted into the pontoons, the pontoons will float or elevate within the water for elevating or raising the outer ends of the frame 18 including the transom pads 30 and 32 and cross beams 58 and 60. As the beam 58 is raised by the pontoons, the rollers 98 (and rollers 116) will ride within the guide channels 100 and 102. Of course, the rollers will move in an arcuate path due to pivotal connection of the frame 18 with the wall 13. The channels 100 and 102, being pivotally secured to the dock, will swing to permit free rolling of the rollers therealong. As the frame 18 is thus elevated, the hull portions of the boat will be engaged thereby whereupon the boat will be elevated simultaneously with the frame.

When the frame has elevated sufficiently, the cross beam 58 will be moved into engagement with the microswitch 118 which stops the operation of the motor 72 and ceases the flow of additional air pressure into the pontoons. The air will remain trapped within the pontoons 62 and 64 and since the ends 84 and 86 of the vent lines 78 and 80 will be disposed beneath the surface of the water. Thus, the frame 18 and boat carried thereby may be maintained in the elevated position as long as desired.

In order to lower the frame 18 for replacing the boat 16 in the water, the air may be released from the pontoons 62 and 64. In order to accomplish this, the rope 88 may be manually handled for pulling or raising the ends 84 and 86 of the lines 78 and 80 out of the water. This permits release of the air from the pontoons and as the air is eliminated therefrom, water will again fill the pontoons. The pontoons and frame 18 carried thereby will thus be lowered within the water. As hereinbefore set forth, the rope 88 may be wedged within the reduced recess 94 of the aperture 90 provided in the arm 92 for retaining the ends 84 and 86 in the exposed position during the elimination of air from the pontoons. When the frame has returned to its lowermost position, the boat 16 will again be disposed within the water and free access to and from the boat well 12 will be provided.

Whereas the particular embodiment of the invention depicted herein utilizes pontoons secured only to the rear or outer portions of the frame, it is to be understood that similar pontoons may be secured to the forward portion of the frame whereby the entire frame may be raised and lowered substantially simultaneosuly instead of the pivotal action hereinbefore described. When the entire frame is raised and lowered simultaneously, it will be apparent that suitable guide channels may be provided in association with the forward end of the frame as well as for the rear portion thereof for facilitating the fluctuations thereof.

From the foregoing, it will be apparent that the present invention provides an individual dry dock for water craft and particularly for relatively small craft of this type. The boat may be easily moored in the dock and elevated as desired for storage out of the water. When the boat is to be used again, the dock may be readily actuated for placing the boat in the water. The novel individual dry dock is simple and efficient in operation and economical and durable in construction.

Changes may be made in the combination and arrangement of parts as heretofore set forth in the specification and shown in the drawings, it being understood that any modification in the precise embodiment of the invention may be made within the scope of the following claims without departing from the spirit of the invention.

What is claimed is:

1. An individual dry dock for water craft comprising a recess having water therein for receiving the craft therein, a frame disposed within the recess, means secured in the proximity of the recess for pivotally securing the frame therein whereby the frame is vertically movable and pivotal about a horizontal axis, said frame being adapted for being positioned within the craft disposed beneath the recess, pontoon means carried by the frame, said pontoon means having the lower end thereof open for admitting water to the interior thereof, means for directing air under pressure into the pontoon means [through the lower open end] whereby the air will [bubble upwardly through the water and] form an air pocket therein for elevating the frame within the recess whereby the frame will engage the lower portions of the craft for elevation thereof to a position out of the water, and means for discharging the air from the pontoon means whereby the frame may be lowered within the recess for lowering the craft into the water.

2. An individual dry dock for water craft as set forth in claim 1 and including guide means cooperating between the frame and recess for guiding the vertical movement of the frame within the recess.

3. An individual dry dock for water craft and comprising a recess having water therein and provided with one open end for receiving the craft therein, a frame movably disposed within the recess for vertical reciprocation and pivotal movement about a horizontal axis therein, bracket means secured in the proximity of the recess for pivotally securing the frame therein, a plurality of pontoons carried by the frame, said pontoons having the lower end thereof open whereby the pontoons may be filled with water in the lowered position of the frame, means for directing air under pressure into the pontoons through the lower open ends thereof whereby said air will form an air pocket within the pontoons for elevating the frame within the recess, means precluding discharge of the air from the pockets while the frame is to remain in the elevated position, and said last mentioned means operable for discharging the air from the pockets when the frame is to be lowered into the water.

4. An individual dry dock for water craft as set forth in claim 3 and including guide means cooperating between the frame and the recess for guiding the reciprocal movement of the frame.

5. An individual dry dock for water craft comprising a recess having water therein and provided with one open end for receiving the craft therein, a frame movably disposed within the recess for vertical reciprocation thereof and adapted to be disposed beneath the craft disposed within the recess, bracket means secured in the proximity of the recess for pivotally securing the frame therein, a plurality of pontoons carried by the frame, said pontoons having the lower ends thereof open whereby the pontoons may be filled with water in the lowered position of the frame, means for directing air under pressure into the pontoons through the open ends thereof whereby said air will accumulate in a pocket within the pontoons to provide increased buoyancy therefor to elevate the frame within the recess, said frame engaging the lowered portions of the craft for elevating the craft simultaneously therewith to a position out of the water, means precluding discharge of the air from the pockets while the frame remains in the elevated position, and said last mentioned means operable for discharge of the air from the pocket when the frame is to be lowered within the recess for lowering the craft into the water.

6. An individual dry dock for water craft as set forth in claim 5 and including guide means cooperating between the frame and recess for guiding the vertical reciprocation of the frame within the recess.

7. An individual dry dock for water craft having a recess having water therein and one end thereof open for receiving the craft therein and comprising, a frame disposed in the recess for vertical reciprocation therein, a bracket secured in the proximity of the recess for pivotally securing the frame within the recess, said frame in the lowermost position thereof adapted to be disposed within the water beneath the craft within the recess, a pair of pontoons carried at the outer end of the frame, each of said pontoons having the bottom end thereof open whereby the pontoons will be filled with water in the lowermost position of the frame, an air header pipe carried by the frame, conduit means providing communication between the air header pipe and the open bottom ends of the pontoons, air supply means for directing air through the air header pipe and into the open bottom ends of the pontoons to provide a pocket of trapped air for increasing the buoyancy thereof to elevate the frame within the recess, said frame being adapted to engage the lower portions of the craft during elevation thereof for raising the craft to a position out of the water, and means for releasing the trapped air from the pontoons for decreasing the buoyancy thereof whereby the frame will be lowered within the recess to lower the craft into the water, and guide means cooperating between the recess and the frame for guiding the vertical reciprocation thereof within the recess.

8. An individual dry dock for water craft as set forth in claim 7 including switch means actuated by the frame for stopping the supply of air to the pontoons when the frame has reached a predetermined height within the recess.

9. An individual dry dock for water craft as set forth in claim 7 wherein the guide means includes a pair of oppositely disposed pivotal guide channels secured to the sidewalls of the recess in the proximity of the outer end of the frame and pivotal about a horizontal axis, and a plurality of rollers carried by the frame for riding in the guide channels during reciprocation of the frame.

10. An individual dry dock for water craft as set forth in claim 9 and including a limit switch carried by one of the guide channels and operably connected with the air supply means, said limit switch engageable by the frame upon elevation of the frame to a predetermined height within the recess for stopping the actuation of the air supply means for interrupting the supply of air to the pontoons.

References Cited

The following references, cited by the Examiner, are of record in the patented file of this patent or the original patent.

UNITED STATES PATENTS

| | | | |
|---|---|---|---|
| 615,440 | 12/1898 | Dutton | 61—65 |
| 1,296,662 | 3/1919 | Hohorst | 61—65 |
| 1,380,141 | 5/1921 | Hamilton | 61—65 |
| 2,889,795 | 6/1959 | Parks | 61—46.5X |
| 3,069,862 | 12/1962 | Ward | 61—48 |
| 3,191,389 | 6/1965 | Poe | 61—48 |

FOREIGN PATENTS

| | | |
|---|---|---|
| 976,272 | 1964 | Great Britain. |

JACOB SHAPIRO, Primary Examiner

U.S. Cl. X.R.

61—48, 67